(No Model.)

J. G. P. PUTNAM.
ICE CUTTER.

No. 522,490.  Patented July 3, 1894.

WITNESSES:
Joshua Bergstrom
C. Sedgwick

INVENTOR
J. G. P. Putnam
BY
Munn & Co.
ATTORNEYS.

THE NORRIS PETERS CO., PHOTO-LITHO., WASHINGTON, D. C.

UNITED STATES PATENT OFFICE.

JOHN G. P. PUTNAM, OF CLAREMONT, NEW HAMPSHIRE.

ICE-CUTTER.

SPECIFICATION forming part of Letters Patent No. 522,490, dated July 3, 1894.

Application filed December 11, 1893. Serial No. 493,392. (No model.)

*To all whom it may concern:*

Be it known that I, JOHN G. P. PUTNAM, of Claremont, in the county of Sullivan and State of New Hampshire, have invented a new and Improved Ice-Cutter, of which the following is a full, clear, and exact description.

The object of the invention is to provide a new and improved ice cutter, which is simple and durable in construction, very effective in operation, and adapted to be readily propelled over the ice to cut the same with a circular saw.

The invention consists of certain parts and details, and combinations of the same, as will be fully described hereinafter and then pointed out in the claims.

Reference is to be had to the accompanying drawings, forming a part of this specification, in which similar letters of reference indicate corresponding parts in all the figures.

Figure 1:
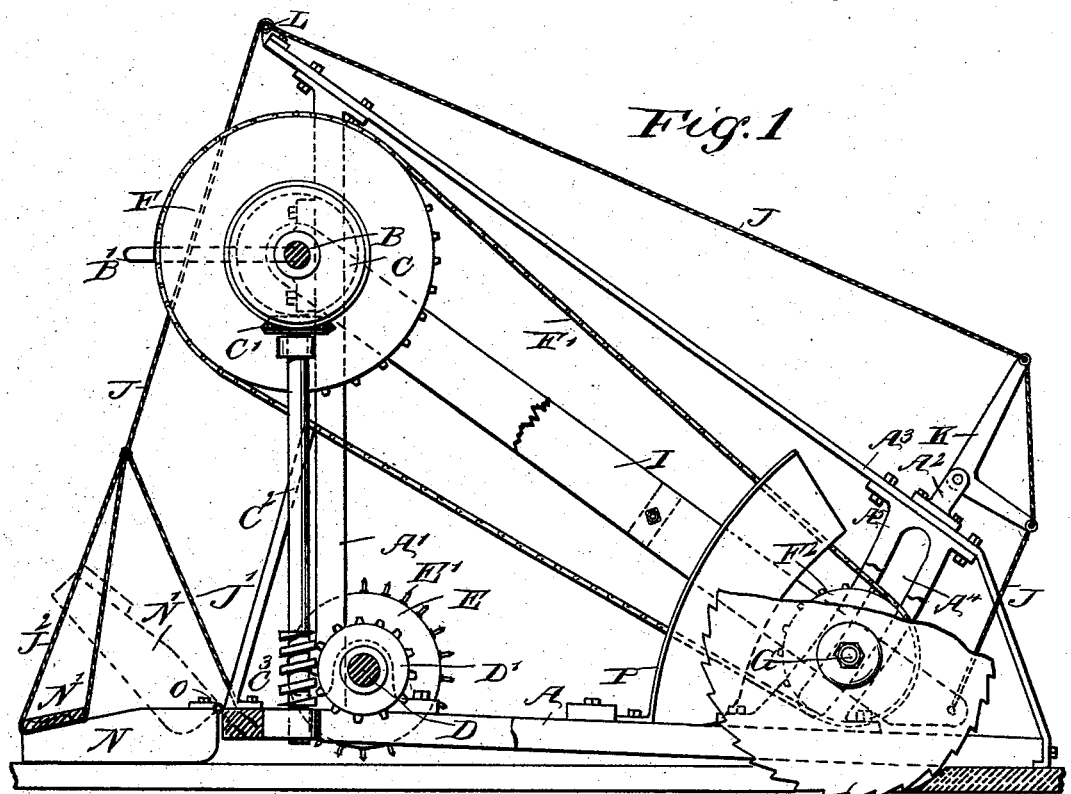
Figure 2:
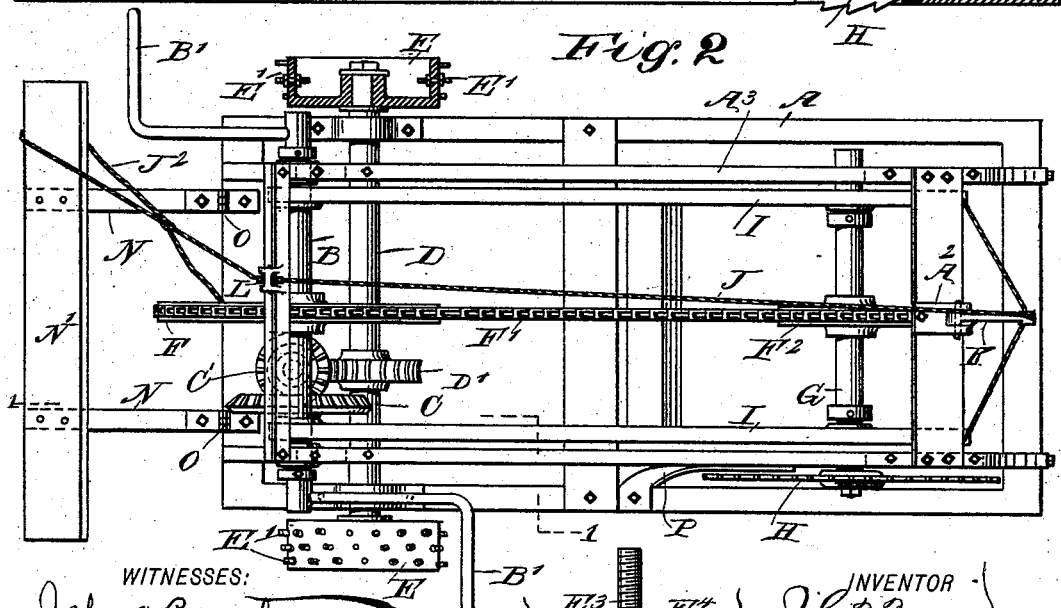
Figure 3:
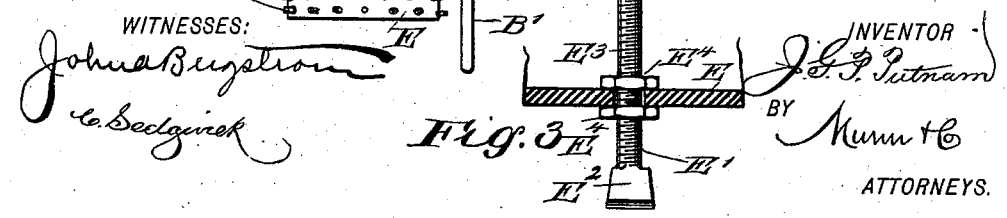

Figure 1 is a side elevation of the improvement with parts in section on the line 1—1 of Fig. 2. Fig. 2 is a plan view of the improvement with one of the propelling wheels in section; and Fig. 3 is an enlarged sectional plan view of one of the spikes on the propelling wheel.

The improved ice cutter is provided with a suitably constructed frame A, adapted to be propelled over the ice to be cut. On the rear part of the frame A are erected standards A′, in which is journaled a transversely extending main driving shaft B, provided at its outer ends with crank arms or handles B′, for conveniently rotating the said shaft B by hand, the operators standing on the frame A. If desired, the shaft B can be turned by power, the motor being located for this purpose on the frame A.

On the shaft B is secured a bevel gear wheel C, in mesh with a bevel pinion C′, secured on the upper end of a vertically disposed shaft $C^2$, journaled in suitable bearings on the frame A and one of the standards A′, the lower end of the said shaft being provided with a worm $C^3$, in mesh with a worm wheel D′, secured on the propelling shaft D, extending transversely and journaled in suitable bearings secured on the main frame A.

On the outer ends of the shaft D and on the sides of the frame A, are arranged the propelling wheels E, each provided in its rim with spikes E′, adapted to engage the ice, so as to propel the frame A forward at the time the wheels are rotated. Each of the spikes E′ is preferably of the construction shown in detail in Fig. 3, and is provided at its outer end with the flattened cutter $E^2$, formed on the threaded shank $E^3$, extending radially through the rim of the corresponding propelling wheel E, the said shank being fastened in place on the rim by nuts $E^4$, screwing on the shank and abutting on the inner and outer surfaces of the rim of the propelling wheel. On the main driving shaft B is also secured a sprocket wheel F, over which passes a sprocket chain F′, also passing over a sprocket wheel $F^2$, secured on the transversely extending shaft or spindle G, carrying at one outer end a circular saw H, of any approved construction, and adapted to cut the ice as the frame A is propelled forward over the ice.

The shaft G, is journaled in suitable bearings arranged in a frame I, fulcrumed loosely on the shaft B, as is plainly shown in the drawings; the said frame being adapted to be raised and lowered by the operators standing on the frame A, so as to regulate the cut of the saw H in the ice, or to raise the saw a suitable distance above the ice. In order to thus raise and lower the saw, I provide a rope or cord J, secured on the front end of the frame I, and extending upward to connect with a bell crank lever K, journaled on a bracket $A^2$, attached to a brace $A^3$, connecting the front end of the frame A with the standards A′. The said bell crank lever K is connected at both arms with the said rope J, which latter extends rearward from the bell crank lever to pass over a pulley L, journaled on the rear end of the frame $A^3$; the rope then extends downward and has its rear end J′ fastened to the frame A, the downward hanging end being under the control of the operators manipulating the crank arms B′.

The shaft G is guided in segmental slots $A^4$, formed in brackets $A^5$, attached to the front end of the frame A, as is plainly shown in Fig. 1.

In order to raise the rear end of the frame A temporarily off the ice in starting the machine, I provide two runners N, connected by hinges O, with the rear transverse beam of the main frame A, the said runners being of sufficient height to lift the frame A at its rear end such a distance above the ice as to bring the cutting edges of the spikes E out of contact with the ice. When the runners N are thrown upward, however, as illustated in dotted lines in Fig. 1, then the under side of the frame A rests on top of the ice, and consequently the spikes E' can engage, and pass into the ice so as to propel the frame forward at the time the propelling wheels E are rotated.

In order to conveniently throw the runners N upward, I form a loop $J^2$ in the rear end of the rope J to engage a transverse beam N' connecting the runners with each other, as illustrated in Figs. 1 and 2.

In order to throw the cuttings of the saw H away from the frame A, I attach to the latter on one of its side beams a fender or guard P, which deflects the cuttings outward away from the frame.

The operation is as follows: In order to start the machine, the runners N are thrown down so as to permit the operators to conveniently rotate the shaft B to give sufficient momentum to the latter and the parts connected therewith, especially the propelling wheels E and the saw H. One of the operators then throws the runners N upward to rest the entire frame A on the ice as previously described, the turning of the shaft B being continued so that the rotary motion transmitted to the propelling wheels E causes the forward movement of the entire machine over the ice and at the same time the saw H, on account of being lowered, cuts into the ice, as will be readily understood by reference to Fig. 1. Thus, it will be seen that by the operators turning the main driving shaft B, a simultaneous forward movement is given to the frame A, and a rotary motion to the saw H, to cause the latter to cut the ice on the forward movement of the machine.

Having thus fully described my invention, I claim as new and desire to secure by Letters Patent—

1. An ice cutter, comprising a main frame, a main driving shaft journaled in the said frame, a propelling shaft carrying propelling wheels and geared with the said main driving shaft, a shaft carrying a circular saw and driven from the said main driving shaft, an auxiliary frame fulcrumed loosely on the said main driving shaft and carrying the said saw shaft, hinged runners for raising and lowering the rear end of the main frame, and a rope secured to the front of the auxiliary frame, for raising and lowering the same, the said rope extending to the rear of the frame and connected with the hinged runners, as and for the purpose set forth.

2. An ice cutter provided with a propelling wheel having adjustable spikes, each formed with a flattened cutter projecting outward from the rim of the wheel, a threaded shank extending from said cutter through the rim of the wheel, and nuts for fastening said cutters in position, one of said nuts bearing against the inner surface of the rim of the wheel and the other being arranged on the shank between the cutter and the outer surface of the rim of the wheel and bearing against the said outer surface, substantially as shown and described.

JOHN G. P. PUTNAM.

Witnesses:
BENJAMIN F. WHITCOMB,
MARSHALL S. ROSSITER.